Feb. 11, 1936. S. BELVEAL 2,030,779
COMBINED COUPLING AND SUSPENSION DEVICE
Filed Feb. 27, 1934
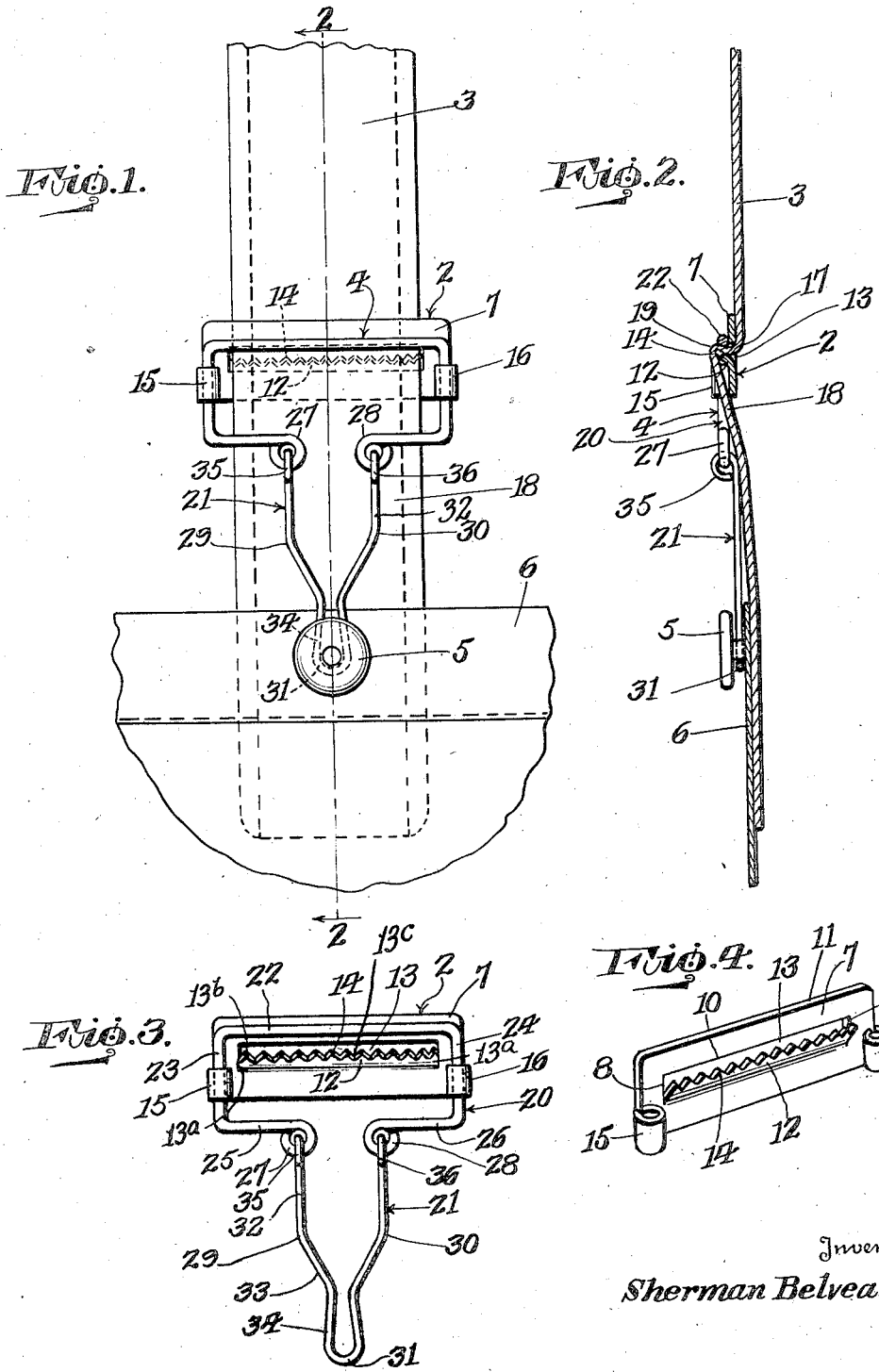
Inventor
Sherman Belveal
By Geo. S. Kimmel
Attorney Patented Feb. 11, 1936

2,030,779

UNITED STATES PATENT OFFICE 2,030,779

COMBINED COUPLING AND SUSPENSION DEVICE

Sherman Belveal, Delphos, Kans.

Application February 27, 1934, Serial No. 713,192

1 Claim. (Cl. 24—73)

My invention relates to a combined coupling and suspension device for a suspending and a suspended object, and my invention aims to provide, in a manner as hereinafter set forth, whereby the pull from the suspended object will operate the device to securely lock thereto the suspending object whereby the said objects will be coupled together.

A further object of my invention is to provide, in a manner as hereinafter set forth, a combined coupling and suspension device having a locking element for an adjustable suspending means and a pressure applying structure for suspending an article, said element and structure being slidably connected together and whereby when shifted relative to each other, the said structure will coact with the locking element to provide for the locking of the suspending means in its adjusted position to the locking element and the coupling of the locked suspending means with the article suspended from the said structure.

A further object of my invention is to provide, in a manner as hereinafter referred to, a device of the class referred to including a locking element and a suspending or combined coupling and pressure applying structure, and with said element and structure coacting to adjustably lock a suspending means to the locking element and for coupling the suspending means with an article suspended from said suspending element.

Further objects of my invention are to provide, in a manner as hereinafter set forth, a device of the class referred to which is simple in its construction and arrangement, strong, durable, compact, thoroughly efficient in its use, readily assembled and comparatively inexpensive to manufacture.

To the above ends essentially, and to others which may hereinafter appear, my invention consists of such parts, and such combination of parts, which fall within the scope of the invention as claimed.

The device is illustrated by way of example in connection with a shoulder suspension strap, that is one of the straps of a pair of suspenders and an outer garment, such as the waist portion of a pair of trousers. It is to be understood however that a combined coupling and suspension device in accordance with this invention may be employed in any connection for which it is found applicable.

In the drawing:—

Figure 1 is a fragmentary view in front elevation of a suspender strap and the waist portion of a pair of trousers, showing the adaptation therewith of a combined coupling and suspension device in accordance with my invention.

Figure 2 is a section on line 2—2 Figure 1.

Figure 3 is a front elevation of the device.

Figure 4 is a perspective view of the locking element.

The device includes a locking element 2 for the suspender strap 3 and a pressure applying structure 4 for a pair of trousers (not shown). The element 4 is shown as being connected to a button 5 upon the waist portion 6 of the trousers. The element 4 also constitutes a pressure applying means for a purpose to be referred to.

The element 2 consists of an oblong body portion 7 of any suitable material, preferably metal having its lengthwise edges disposed in parallelism. The body portion 7 is formed with a pair of spaced parallel straight slits 8, 9 disposed transversely thereof and a lengthwise straight slit 10. The outer walls or edges of the slits 8, 9 are intersected centrally by the longitudinal median of the body portion 7. The distance between the outer wall or edge of a transverse slit and an end edge of body portion 7 is the same as the distance between the outer wall or edge of the lengthwise slit and the edge 11 of the body portion 7. The ends of the outer lengthwise wall of the slit 10 merge into the upper ends of the outer walls of the slits 8, 9. The material freed by the slits 8, 9 and 10 is bent outwardly with respect to the outer face of body portion 7 and at an upwardly inclination to provide a locking member 12 and a passage 13. The side edges of the member 12 have straight inner parts or portions 13$^a$ and oppositely inwardly inclined outer parts or portions 13$^b$. The free lengthwise edge of the member 12 is formed with uniform V-shaped cutouts 13$^c$, which, in connection with the inclined outer side edge portions 13$^b$, provide the free lengthwise edge of member 12 with spaced uniform tapered teeth 14. The front of the body 7, at the lower portion of each end thereof is formed with a vertically disposed cylindrical barrel, and which are designated 15, 16. The barrels are integral with the lower portions of and having their outer sides extended laterally from the end edges of body portion 7. The rear sides of the barrels abut the outer face of body portion 7. The upper ends of the barrels align with the bend of member 12. The inner sides of the barrels are spaced from the outer walls or edges of the slits 7, 8 and the bend of 12. The latter is employed for locking the strap 3 is adjusted position. The strap 3 is to be extended through passage 13 to engage the teeth 14 and then depend downwardly from member 12, and which arrangement provides the strap 3 with a pair of stretches 17 and 18 disposed at an angle to each other. The stretch 17 of strap 3 extends at right angles to the body 7 (Figure 2). The bend 19 between stretches 17 and 18 is to be engaged by the teeth 14 and held in such position by the element 4 for locking in the strap 3 in its adjusted position.

The combined coupling and suspension element 4 is of skeleton form and it includes a section 20 forming a pressure applying means for element 2 and a section 21 forming a means for coupling a button thereto. The section 20 is in the form of a rectangular loop closed at its top and sides and open centrally of its bottom. The section 21 is in the form of a loop of less width and greater length than section 20, open at its top, closed at its bottom and having a contracted lower end portion.

The section 20 comprises a top wall 22, a pair of side walls 23, 24 and an open bottom wall formed of a pair of stretches 25, 26 extending inwardly from the lower end of the walls 23, 24 respectively. The inner ends of the stretches 25, 26 are spaced from each other and formed with the eyes 27, 28 respectively. The side walls 23, 26 slidably extend through the barrels 15, 16 respectively whereby section 20 is slidably connected to the front of element 2. The length of the side walls is greater than the height of the barrels. The top wall 22 of section 20 may be shifted beyond the outer or top edge 11 of body portion 7.

The section 21 comprises a pair of oppositely disposed side walls 29, 30 of like form and which at their lower ends merge into the ends of a bottom wall 31 of segmental contour. Each side wall consists of an upper stretch 32, an intermediate stretch 33 and a lower stretch 34. The stretch 33 extends inwardly at an inclination from the lower end of stretch 32 and merges into the upper end of stretch 34. The latter extends outwardly at an inclination from the lower end of stretch 33 and merges into one end of the wall 31. The inclination of stretch 34 is materially less than that of stretch 33. The stretch 33 is of greater length than stretch 34. The stretches 32 are arranged in parallel spaced relation and provided at their upper ends with eyes 35, 36 which connect with and are disposed at right angles to the eyes 27, 28 respectively. The eyes 27, 28, 29 and 30 coact to pivotally connect section 21 to section 20.

When the device is in use the top wall 22 of section 20 is arranged above passage 13 and after strap 3 is positioned relative to element 2, the top wall 22 is seated upon stretch 17. The section 21 of element 4 is attached to button 5 whereby the trousers and suspender strap 3 are coupled together. The weight of the trousers upon element 4 will pull the latter downwardly to abut stretch 17, exerting pressure on the latter to an extent whereby the member 12 will lock strap 3 to element 2. By shifting section 20 upwardly relative to element 2 to position top wall 22 in spaced relation to stretch 17, the strap 3 may be released from element 2.

What I claim is:—

In a combined coupling, adjusting and suspension device, a combined pressure applying and coupling means consisting of an upper skeleton member and a lower skeleton member, said upper member being of greater width and of less length than said lower member, said upper member being formed with an opening and the central portion of its bottom with a passageway leading to said opening and depending eyes extending in opposite lateral directions from the sides of said opening and bordering said passageway, said lower member being open at its upper end and having a contracted lower portion, the upper end of the sides of said lower member being in the form of outwardly directed eyes depending from the upper terminous of said member, disposed at right angles to and coacting with the eyes of the upper member for loosely connecting said members together.

SHERMAN BELVEAL.